(12) United States Patent
Plain

(10) Patent No.: US 9,858,121 B1
(45) Date of Patent: *Jan. 2, 2018

(54) CONTEXT SUBSYSTEMS FOR SYSTEM CONFIGURATIONS

(71) Applicant: Versata Development Group, Inc., Austin, TX (US)

(72) Inventor: Kevin R. Plain, Dacono, CO (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,710

(22) Filed: Jul. 13, 2016

Related U.S. Application Data

(60) Continuation of application No. 13/897,626, filed on May 20, 2013, now Pat. No. 9,418,084, which is a continuation of application No. 12/036,460, filed on Feb. 25, 2008, now Pat. No. 8,447,784, which is a division of application No. 09/704,455, filed on Nov. 1, 2000, now Pat. No. 7,337,179.

(51) Int. Cl.
*G06F 17/30* (2006.01)
*G06F 9/50* (2006.01)
*G06F 9/48* (2006.01)

(52) U.S. Cl.
CPC .......... *G06F 9/5011* (2013.01); *G06F 9/4881* (2013.01); *G06F 17/30286* (2013.01)

(58) Field of Classification Search
CPC ......... G06F 17/30327; G06F 17/30282; G06F 17/30592; G06F 17/30781; G06F 17/30286; G06F 17/30289; G06F 17/30889; G06O 10/06

USPC .............. 707/790–797, 802, 803, 809–812; 709/220

See application file for complete search history.

(56) References Cited

PUBLICATIONS

B. Falcidieno et al., A system for extracting and representing feature information driven by the application context, 1990, IEEE, vol. 3, 1672-1678.*
Supplemental Notice of Allowability dated May 11, 2016, mailed in U.S. Appl. No. 13/897,626, pp. 1-6.

(Continued)

*Primary Examiner* — Jean B Fleurantin
(74) *Attorney, Agent, or Firm* — Terrile, Cannatti, Chambers & Holland, LLP; Kent B. Chambers

(57) ABSTRACT

Embodiments of the present invention utilize context subsystems to logically group resources according to context. Such context subsystems can be nested (i.e. hierarchical), and thus further simplify the complex configuration relationships encountered with complex systems. Higher level (i.e. parent) context subsystems contain at least one resource that is utilized by a lower level (i.e. child) component, subsystem, or context subsystem. Context subsystems can be hierarchically arranged in single- and multi-parent arrangements and single- and multi-child arrangements. The number of context subsystem hierarchical levels is virtually unlimited and is generally dictated by the complexity of the system and the corresponding simplification needs of the configuration technology being utilized to configure the system. Context subsystems are applicable and useful in a configuration environment for virtually any configurable system amenable to contextual groupings of resources.

18 Claims, 13 Drawing Sheets

(56) References Cited

PUBLICATIONS

Notice of Allowance dated Apr. 15, 2016, mailed in U.S. Appl. No. 13/897,626, pp. 1-51.
Response to Non-Final Office Action dated Jun. 5, 2015, as filed in U.S. Appl. No. 13/897,626 on Dec. 7, 2015, pp. 1-9.
Non-Final Office Action dated Jun. 5, 2015, mailed in U.S. Appl. No. 13/897,626, pp. 1-28.
Request for Continued Examination (RCE) and RCE Submission as filed in U.S. Appl. No. 13/897,626 dated Feb. 6, 2015, pp. 1-13.
Terminal Disclaimer Review Decision dated Jan. 22, 2015, mailed in U.S. Appl. No. 13/897,626, 1 page.
Advisory Action dated Jan. 14, 2015, mailed in U.S. Appl. No. 13/897,626, pp. 1-4.
Terminal Disclaimer as filed in U.S. Appl. No. 13/897,626 dated Jan. 6, 2015, pp. 1-2.
Response to Final Office Action dated Aug. 6, 2016, as filed in U.S. Appl. No. 13/897,626 Jan. 5, 2015, pp. 1-10.
Final Office Action dated Aug. 6, 2016, mailed in U.S. Appl. No. 13/897,626, pp. 1-31.
Response to Non-Final Office Action dated Nov. 5, 2013, as filed in U.S. Appl. No. 13/897,626 on May 5, 2014, pp. 1-13.
Non-Final Office Action dated Nov. 5, 2013, mailed in U.S. Appl. No. 13/897,626, pp. 1-26.

\* cited by examiner

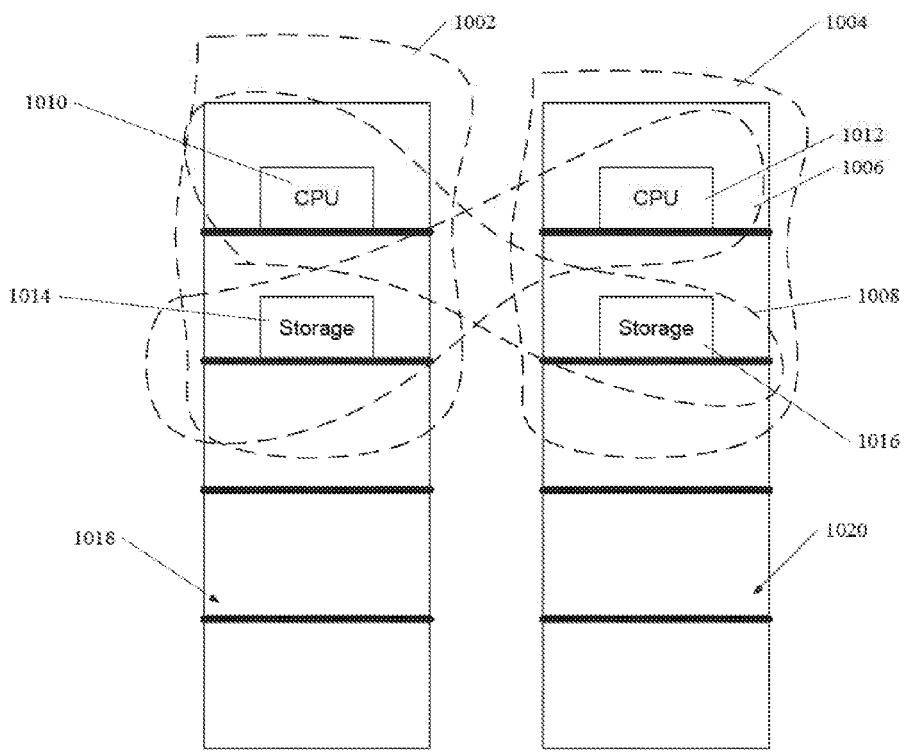
Figure 10A
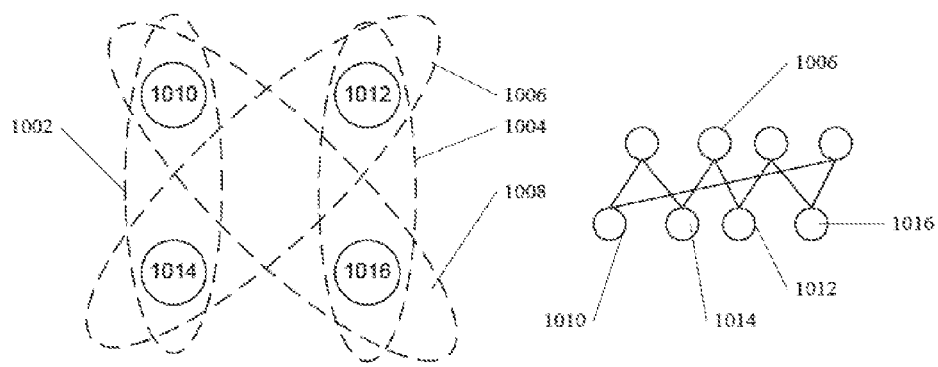
Figure 10B                    Figure 10C

CONTEXT SUBSYSTEMS FOR SYSTEM CONFIGURATIONS

BACKGROUND OF THE INVENTION

Field of the Invention

The present invention relates to the field of configuration of resources and more specifically relates to the use of context subsystems to address configuration problems and particularly complex configuration problems.

Description of the Related Art

Configuring a system refers to the process of selecting and connecting components to satisfy a particular need or request. If a system is based on a limited number of components, the process of configuring the system can be relatively straightforward. For example, the purchase of an automobile requires a salesperson to configure a system (automobile and assorted options) to satisfy a customer's request. After selecting from a plurality of models, the salesperson completes the transaction by selecting options to configure and price an automobile.

In another relatively simple example, one could describe the configuration of a system such as a 3 legged stool by stating that "the seat is connected to a first bolt, the first bolt is connected a first leg, the first leg is connected to a first foot pad. The seat is also connected to a second bolt, the second bolt is connected a second leg, the second leg is connected to a second foot pad. The seat is also connected to a third bolt, the third bolt is connected to a third leg, the third leg is connected to a third foot pad. As is evident, as finishes, leg cross bars and hardware, seat cushions and fastening materials, etc. are added to a relatively simple stool, the configuration problem becomes more involved. Then, the problem becomes more difficult when a change is made. The change must be verified as correct and the change analyzed to evaluate any impact on components that were dependent on the original configuration.

Thus, as system specifications become more customized and varied, configuration alternatives increase and the task of configuring a system becomes more complex. This increased complexity has resulted in a need for computer-based assistance with the configuration process.

A configuration modeling language is used to create configuration code for organizing and conveying system configuration information in a manner that can be understood and confirmed by a computer. Configuration technology developed by companies such as Trilogy, Inc. ("Trilogy") of Austin, Tex. utilize configuration code generated using configuration modeling language to 'describe' and solve both simple and complex configuration problems. An example of such configuration technology is set forth in U.S. Pat. No. 5,515,524 by John Lynch and David Franke and assigned to Trilogy (referred to herein as the "Lynch Patent"), which is herein incorporated by reference in its entirety.

As is generally self evident, society is producing more and more complex systems in a wide array of industries. For example, in the computer industry, an example of a complex system is a desktop computer system. The available configuration alternatives of a computer system are numerous and varied, including alternatives available when choosing the microprocessor, motherboard, monitor, video controller, memory chips, power supply, storage devices, storage device controllers, modems, and software.

Configuring a desktop computer system requires that a selected component is compatible with the other components in the configured system. For example, a power supply must be sufficient to supply power to all of the components of the system. In addition, the monitor must be compatible with the video controller (e.g., resolution), and the storage device must be compatible with its controller (e.g., SCSI interface). A motherboard must have enough slots to handle all of the boards installed in the system. The physical constraints of the cabinet that houses the system's components are also considered. The cabinet has a fixed number of bays available for storage devices (e.g., floppy disk drives, hard disk drives, or tape backup units). These bays have additional attributes that further define their use. For example, the bay may be located in the front of the cabinet and provide access from the front of the cabinet. Another bay may be located behind the front-accessible bays, and be limited to devices that do not need to be accessed (e.g., hard disk drive). Bays may be full-height or half-height. Before a storage device can be added to the configuration, a configuration system must identify a bay into which the storage device will be housed. This requires that at least the accessibility and height of the storage device must be examined to determine compatibility with an available cabinet bay.

The connection between a storage device and its controller must be determined based on the location of each. The cable that connects the storage device and its controller must provide compatible physical interfaces (e.g., 24-pin male to a 24-pin female).

A method of establishing a communication pathway in a computer system is known as daisy chaining. Daisy chaining provides the ability to interconnect components such that the signal passes through one component to the next. Determining whether a daisy chain may be established requires that the available logical (e.g., IDE or SCSI) and physical interfaces (e.g., 24-pin) of all elements in a daisy chain be known. In addition, it is important to know whether conversions from the source datatype to the destination datatype are allowed. When a daisy chaining candidate is added to the system, the interconnections and conversions between existing components may be checked to determine whether the new component should be an element of the daisy chain.

Additionally, a configured system also often includes software programs that must be included as part of the configured system. Software programs are of a variety of types such as operating systems, application programs, and communication protocols.

Thus, relative to the "3 legged stool" configuration problem, the desktop computer system configuration problem demands an exponentially more complex solution. Applying conventional configuration technology, such as the technology described in the Lynch Patent, to the desktop computing system configuration problem has proved to be a workable solution.

However, systems are becoming even more complex. With more components being added, more connections being made, and more resources being utilized, it is evident that conventional modeling languages will generate large quantities of complex configuration code, which can be difficult to create and evaluate for accuracy. Thus, the potential for errors and the amount of maintenance time necessary to catch and correct errors and modify complex configurations can be staggering.

Referring to FIG. 1, a NUMA (Non-Uniform Memory Access) system 100 presents an example of potentially very complex configuration problem. NUMA system 100 is a type of parallel processing architecture in which each processor has its own local memory but can also access memory local to other processors. In terms of configuration implementations, it can be described as individual computer systems (each designated as a "CPU") 102a-d that can act as one machine. There is one copy of an operating system and single copies of any additional software collectively referred to as software 104 for the entire complex of machines. Thus, software 104 is a shared resource, but to prevent multiple instances of software 104 from appearing in the configuration code representing NUMA 100, software 104 is coded to "live" with (i.e. are identified with) CPU subsystem 102a. But, additional NUMA system 100 configuration code is generated so that each processor is configured to use software 104. An example configuration complexity problem arises when NUMA system 100 is modified to remove one of the CPU subsystems. If CPU 102a is removed, then all the software 104, which lives in CPU 102a, is removed as well. Thus, NUMA system 100 configuration code must not only be modified to remove CPU 102a, the code must be analyzed to locate all shared resources such as software 104 and modified to associate software 104 with one of the remaining CPUs 102b-d.

As evident from the above configuration examples, configuration problems are becoming increasingly complex and difficult to trouble-shoot and maintain.

SUMMARY OF THE INVENTION

Embodiments of the present invention address many of the difficulties encountered when configuring, maintaining, and organizing resource information for systems, especially complex systems. Embodiments of the present invention utilize context subsystems to logically group resources according to context. Such context subsystems are especially useful as they can be nested (i.e. hierarchical), and thus further simplify the complex configuration relationships encountered with complex systems. Higher level (i.e. parent) context subsystems contain at least one resource that is utilized by a lower level (i.e. child) component, subsystem, or context subsystem. Context subsystems can be hierarchically arranged in single- and multi-parent arrangements and single- and multi-child arrangements. The number of context subsystem hierarchical levels is virtually unlimited and is generally dictated by the complexity of the system and the corresponding simplification needs of the configuration technology being utilized to configure the system.

Context subsystems are applicable and useful in a configuration environment for virtually any configurable system amenable to contextual groupings of resources. Example systems include data communication and data processing networks, NUMA systems, partitioned computer systems, systems disposed in a variety of spatial relationships, automobiles, aircraft, other vehicles, complex machinery, telecommunication systems, and container and rack systems used to support interconnected hardware.

In one embodiment, context subsystems of the present invention are utilized in conjunction with conventional configuration technology, such as the configuration technology disclosed in the Lynch Patent, to organize and maintain resource data. For example, by grouping resources by context, resources that are utilized by multiple resources can be identified with the context subsystem rather than with a particular one of the resources.

BRIEF DESCRIPTION OF THE DRAWINGS

The present invention may be better understood, and its numerous objects, features, and advantages made apparent to those skilled in the art by referencing the accompanying drawings.

FIG. 10A illustrates context subsystems for computer systems disposed on multiple racks.

FIG. 10B illustrates a simplified representation of the context subsystems of FIG. 10A.

FIG. 10C illustrates context subsystem data structures for the context subsystems illustrated in FIGS. 10A and 10B.

The use of the same reference symbols in different drawings indicates similar or identical items.

DESCRIPTION OF THE PREFERRED EMBODIMENT(S)

The following description of the invention is intended to be illustrative only and not limiting.

Embodiments of the present invention address many of the difficulties encountered when configuring, maintaining, and organizing resource information for systems, especially complex systems. In general, a context subsystem is a logical (i.e. contextual) grouping of resources where at least one of the resources in the context subsystem is utilized by one of the other resources in the context subsystem. The term "logical" or "contextual" grouping is generally used to denote that the context is distinct from the physical configuration relationships. This does not mean that physical configuration relationships are irrelevant. It means that the context subsystem is determined based on a logical grouping of resources based on utilization rather than physical interconnectivity. The term resource can refer to an individual resource, a subsystem (i.e. a collection of resources), or a context subsystem.

As will become more evident in the descriptions and examples below, context subsystems represent a fundamental addition to the conventional conceptualization of system configuration problems. Context subsystems reduce extremely difficult configuration and configuration maintenance problems to more simplified data structures and methods of organizing, maintaining, configuring, and locating resources in a configurable system. Furthermore, context subsystems contain information that allows a system to be displayed from a contextual standpoint and distinct from a physical relationship. Such display can be very useful in visually apprehending a complex system such as a partitioned computer system, which may consist of many computer systems physically disposed in multiple racks or containers and possibly in various rooms or buildings.

Figure 1:
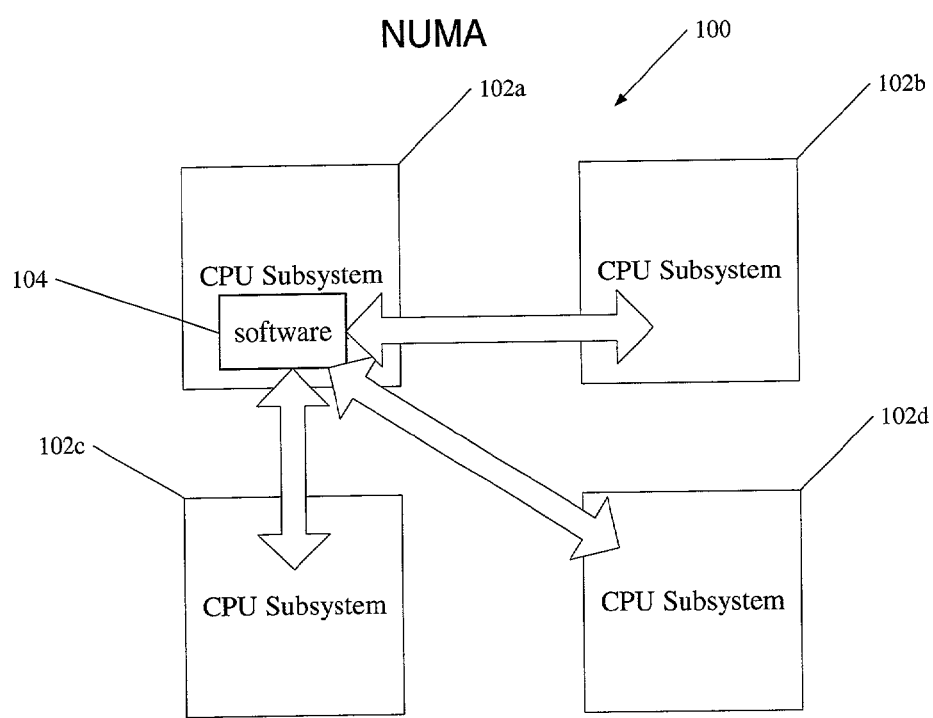
FIG. 1 (prior art) illustrates a conventionally configured NUMA system.
Figure 2:
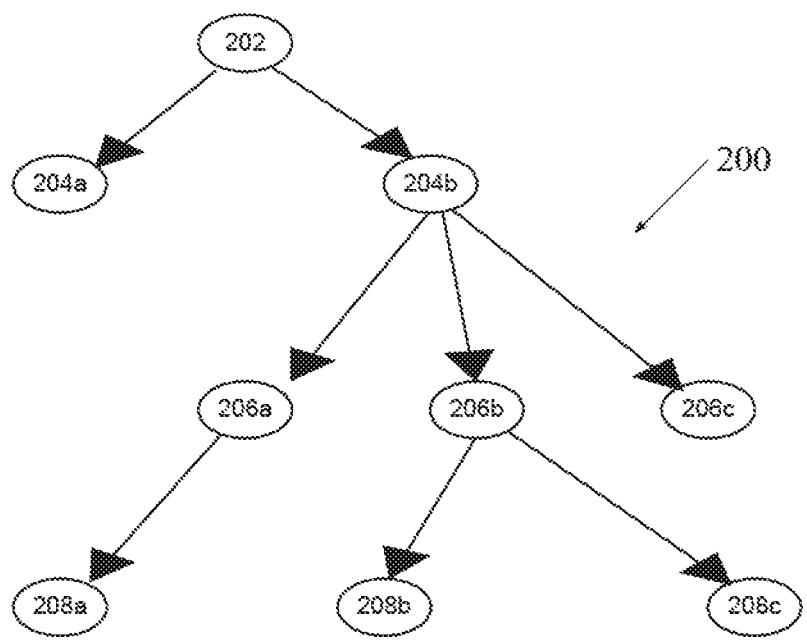
FIG. 2 illustrates one embodiment of a hierarchical data structure of multiple context subsystems organized in a tree structure.
Figure 2B:
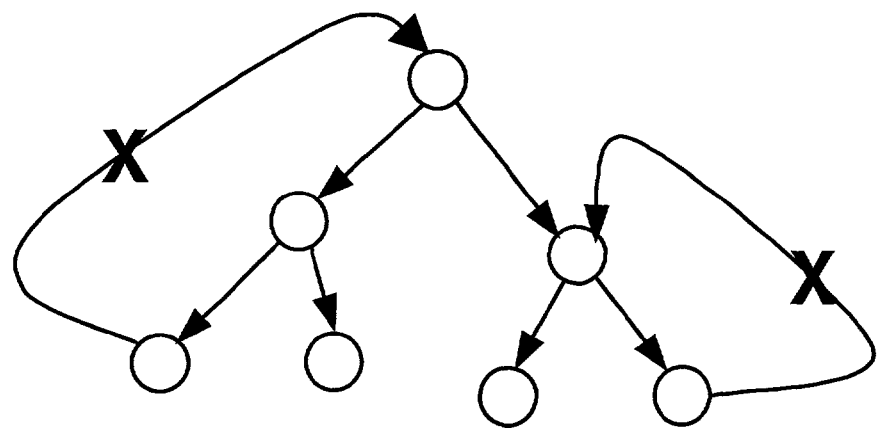

FIG. 2 illustrates a hierarchical data structure 200 of multiple context subsystems organized in a tree structure. Node 202 and nodes 204a and 204b represent a context subsystem with node 202 being a parent to the two children 204a and 204b. Node 202 may represent a resource, such as a container or a power supply subsystem, that is utilized by both resources 204a and 204b. Node 204b and nodes 206a, 206b, and 206c represent another single parent, multiple child context subsystem. Nodes 206 and 208a represent a single parent, single child context subsystem. Node 206b and nodes 208b and 208c represent another single parent, multi-child context subsystem. Note that "leaf" nodes 204a, 206c, and 208a-c, i.e. nodes that do not have other nodes connected at a lower level, may represent a single resource, such as a circuit card, or may represent a subsystem of resources such as multiple circuit cards or a mass data storage unit and multiple circuit cards.

Figure 3A:
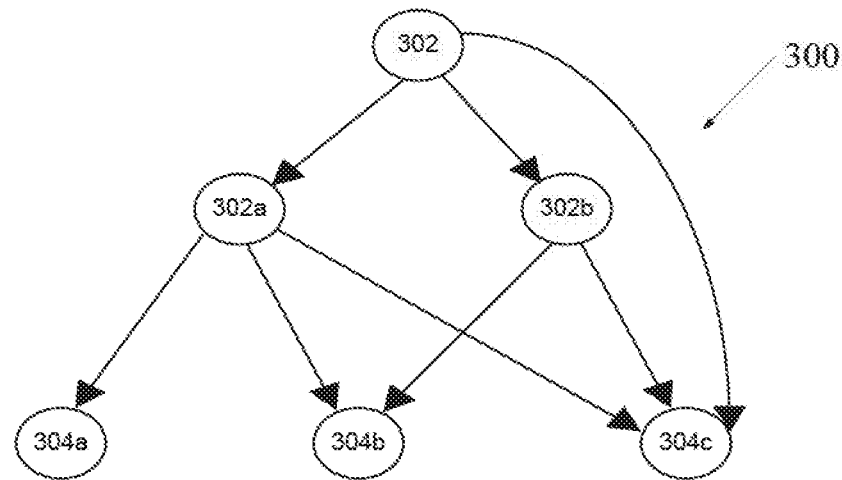
FIG. 3A illustrates one embodiment of a hierarchical data structure of multiple context subsystems organized in a directed graph.

FIG. 3A illustrates another embodiment of a hierarchical data structure of multiple context subsystems. Context subsystem data structure 300 is organized as a directed graph of context subsystems. Node 302 and nodes 302a and 302b represent a multi-child, single parent context subsystem. Node 302a and nodes 304a-c represent another multi-child, single parent context subsystem. Node 302b and nodes 304b-c represent another multi-child, single parent context subsystem. Nodes 302a-b and node 304b represent a single child, multi-parent context subsystem. Nodes 302, 302a, and 302b and node 304c represent a multi-parent, multi-child context subsystem.

Figure 3B:
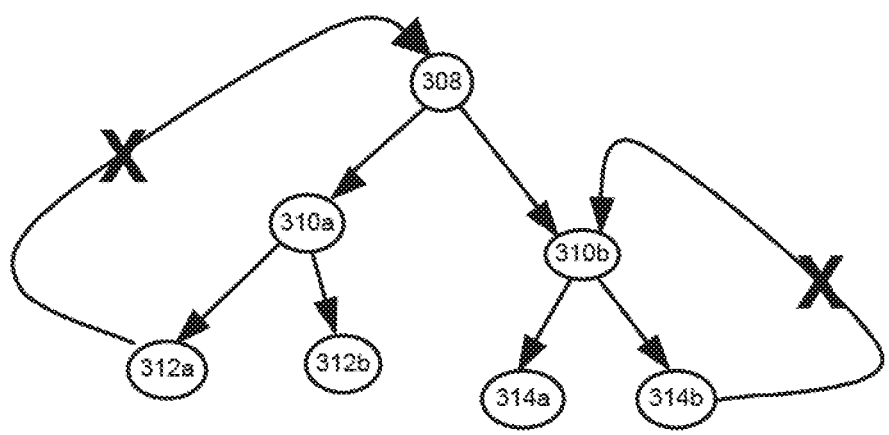
FIG. 3B illustrates an embodiment of a cyclic context subsystems data structure.

Referring to FIG. 3B, in the preferred embodiment of context subsystem data structures, cycles are not permitted as indicated by the "X", i.e. a parent node cannot be a child node to a child node of the parent. Nodes 310a and 310b are child nodes of node 308. Nodes 312a and 312b are child nodes of node 310a. Nodes 314a and 314b are child nodes of node 310b. Thus, node 308 is preferably not a child node of node 310a, and node 310b is preferably not a child node of node 314b.

It is evident that nodes can very easily be added to and/or subtracted from context subsystem data structures 200 and 300. Child nodes can be added when a parent node includes a resource utilized by resources represented by the child node, and parent nodes can be added to include one or more resources that may be utilized by one or more child nodes. Thus, as described below, the context subsystem data structure framework is easily conceptualized and implemented.

Context subsystems generally have two main attributes, my_parent_subsystems and my_child_subsystems. These attributes maintain a list of parent subsystems and a list of child subsystems, respectively. These attributes may be referenced to determine which context subsystems are parents or children of a subsystem. The my_parent_subsystem and my_child_subsystems attributes maintain a context subsystem hierarchy. Conventional subsystems can be created and linked to other subsystems with nonhierarchical attributes. In other words, conventional subsystems are only leaf nodes and do not contemplate child attributes. In embodiments of the present invention, conventional subsystems can be used as a leaf nodes in a context subsystem hierarchical data structure.

Figure 4A:
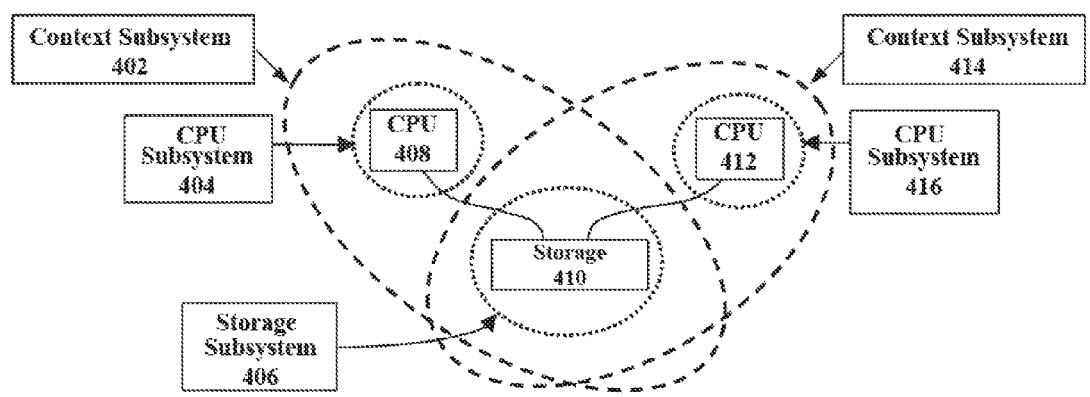
FIG. 4A illustrates a multi-parent, single child context subsystem.
Figure 4B:
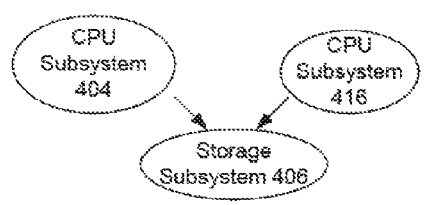
FIG. 4B illustrates a context subsystem data structure of the context subsystem illustrated in FIG. 4A.

FIGS. 4A and 4B illustrate that a context subsystem can have multiple parent subsystems (my_parent_subsystems), meaning it can belong to more then one context. Storage subsystem 406 includes a mass data storage unit, storage 410, that utilizes the resources of CPU subsystem 404. CPU subsystem 404 resources include CPU 408. Storage subsystem 406 and CPU subsystem 404 are contextually grouped together to form context subsystem 402. Storage subsystem 406 also utilizes the resource of CPU subsystem 416. The CPU subsystem 404 resource is CPU 412. Storage subsystem 406 and CPU subsystem 416 are contextually grouped together to form context subsystem 414.

FIG. 4B illustrates the context subsystem data structure of the context subsystem of FIG. 4A with parent attributes being CPU Subsystems 404 and 416 and a child attribute of storage subsystem 406.

Figure 5A:
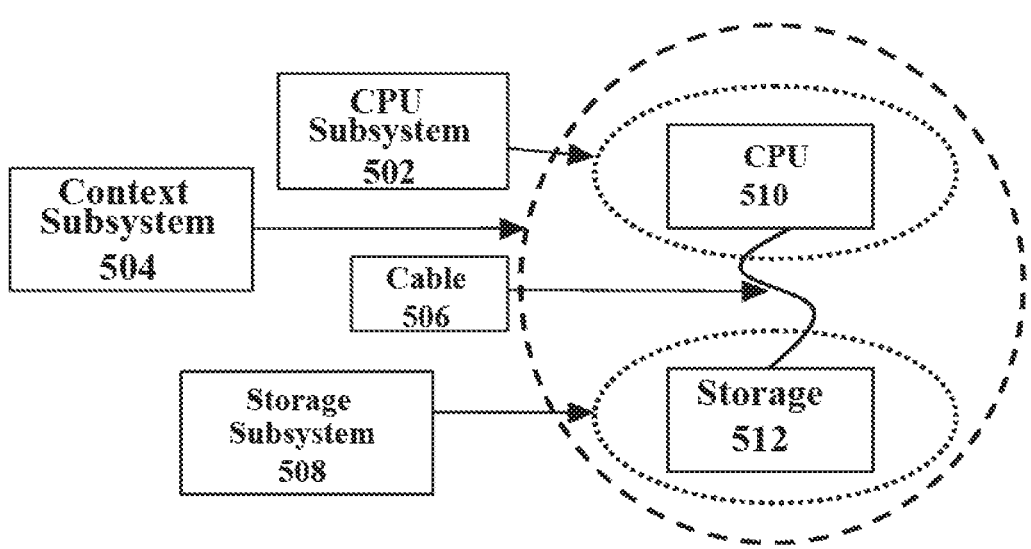
FIG. 5A illustrates a multi-child, single parent context subsystem.
Figure 5B:
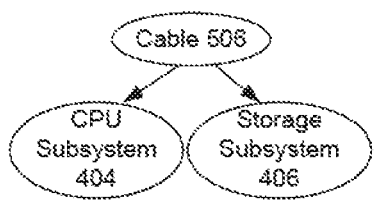
FIG. 5B illustrates a context subsystem data structure of the context subsystem illustrated in FIG. 5A.

FIGS. 5A and 5B illustrate that a context subsystem can also have multiple child subsystems (my_child_subsystem), meaning it can constitute a context for more than one subsystem or individual resource. Context subsystem 504 is formed around parent attribute cable 506. Cable 506 is utilized by both CPU subsystem 502 and storage subsystem 508. Thus, a context subsystem is identified to include child attributes of CPU subsystem 502 and storage subsystem 508. CPU subsystem 502 includes CPU 510, and storage subsystem 508 includes storage device 512.

FIG. 5B illustrates the context subsystem data structure of the context subsystem of FIG. 5A with parent attribute being cable 506 and child attributes being CPU subsystem 502 and storage subsystem 508.

Several functions are useful in creating and utilizing subsystems and are set forth in Table 1.

TABLE 1

| Function/Constraint | Description |
| --- | --- |
| create_context_subsystem_if_needed | An abstract constraint that creates a context subsystem on behalf of an instance. |
| function Multivalued SubSystem_Instance top_level_subsystems on Component( ) | Finds the top-level context subsystems. |
| function Multivalued Component_Instance my_context_instances_child on _SubSystem ( ) | Retrieves all instances in a subsystem and all instances of child subsystems. |
| function Multivalued Component_Instance my_context_instances_parent_mCI on SubSystem ( ) | Retrieves all component instances in a subsystem and all instances of parent context subsystems. |
| function Boolean add_child_to_parent_subsystem_B | Creates a parent-child relationship between two subsystems. Returns |

TABLE 1-continued

| Function/Constraint | Description |
| --- | --- |
| on _SubSystem (CIM_Context_SubSystem_Instance ?parent_CI) | FALSE if not successful. |
| function Boolean remove_child_from_parent_subsystem_B on _SubSystem (Context_SubSystem_Instance ?parent_CI) | Breaks a parent-child relationship between two subsystems. Returns FALSE if not successful. |

Table 2 describes example functions for context subsystems that can be used by used by modeling and configuration technology, such as the technology described in the Lynch Patent.

TABLE 2

| Function/Constraint | Description |
| --- | --- |
| function SubSystem identify_context_subsystem_C on Component( ) | Returns the name of the component that the a configuration model creates to serve as a Subsystem. This constraint accesses the value stored in the attribute subsystem_C and returns ?this. subsystem_C. |
| function Component_Instance decide_to_create_context_subsystem_without_dependency on Component( ) | Creates a new context subsystem and sets no dependency between the component and the context subsystem. The context subsystem should be manually deleted when the configuration model no longer needs it. This function returns NULL. This function can be used in conjunction with function Component_Instance decide_to_create_context_subsystem_with_dependency on Component( ). |
| function Component_Instance decide_to_create_context_subsystem_with_dependency on Component( ) | Creates a new context subsystem and maintains the default dependency provided by the requiresComponent call. This way, when the component is deleted, the model automatically deletes the subsystem, as well. This function returns an instance. Use the function in conjunction with function Component_Instance decide_to_create_context_subsystem_without_dependency_CI on Component( ). |
| function Boolean decide_to_join_context_subsystem_B on Component(CIM_SubSystem_Instance ?subsystem) | Sets the value of the attribute subsystem_C to the subsystem that is passed as an argument. |
| function Boolean create_new_context_subsystem_even_if_i_have_one_already_B on Component( ) | Determines whether or not to create a new subsystem if the component requiring the context subsystem is already in a subsystem. The default return value for this function is FALSE. |

Context subsystems can be created with or without dependencies to resources, i.e. context subsystem A requires resource B, so context subsystem A depends from principal resource B. Generally, a dependent context subsystem will automatically be added when a principal resource is created and will automatically be removed when a principal resource is removed.

The following describes the methodology in creating a context subsystem. As stated above, in general, a context subsystem is a logical (i.e. contextual) grouping of resources where at least one of the resources in the context subsystem is utilized by one of the other resources in the context subsystem. In one embodiment, creating a new context subsystem takes place through coding constraints that are defined on a principal resource of the logical group defining the context subsystem. The principal is generally utilized by one or more resources. Thus, in one embodiment where the principal resource is a parent resource, unless the context subsystem is dependent on a particular child resource, removal of the child resource in a context subsystem does not affect the existence of the parent resource.

For example, an instance of a system board is typically the first to be created in a CPU subsystem, one of its installation constraints creates a CPU subsystem, and attaches the system board instance to that subsystem. All other instances that constitute a CPU system, such as cards, drives and cases, have constraints that add these instances to the CPU subsystem created by the system board.

In other cases, such as storage, there is generally no one principal resource to which the task of creating a subsystem can be assigned, since no particular order is established for creating drives, controller cards, and storage bays. In this case, the task is assigned to all or some of the components of that logical group, with the provision that these components first try to attach to an existing subsystem before attempting to create a new one.

Context subsystems do not require the existence of a real component in order to exist. For example, system boards can bring in CPU subsystems and storage cases can bring in storage subsystems.

Before modeling a new context subsystem, the following questions should generally be answered. The answers to these questions provide specific information about the logical grouping represented by the context subsystem, which helps direct the methodology when designing the behavior of a new context subsystem.

What subsystem component should be created?

Should the new context subsystem cover [This Resource] as one of the instances?

Does a dependency exist? If not, the context subsystem should be deleted when it is no longer needed.

Should a context subsystem be created even if [This Resource] already has one? (See second bulleted item in this list.)

FIGS. 6-11 illustrate example systems that utilize context subsystems and associated context subsystem data structures. The following describes methodologies for deciding when and how to use a context subsystem(s). Concise and relatively simple examples of systems and context subsystems are illustrated herein for clarity. However, specific configuration requirements and user preferences can dramatically influence the style and frequency of invoking context subsystems.

Referring to FIG. 6, partitions of hardware into multiple computer systems is a very complex configuration problem. In a partitioned computer system, each partition is generally considered a single computer. The entire computer system, i.e. all of the resources (hardware, software, etc.) is partitioned into multiple computer systems. Each computer system partition may utilize common resources such as power from a single power supply, access to common mass storage, a common case, etc.

Figure 6A:
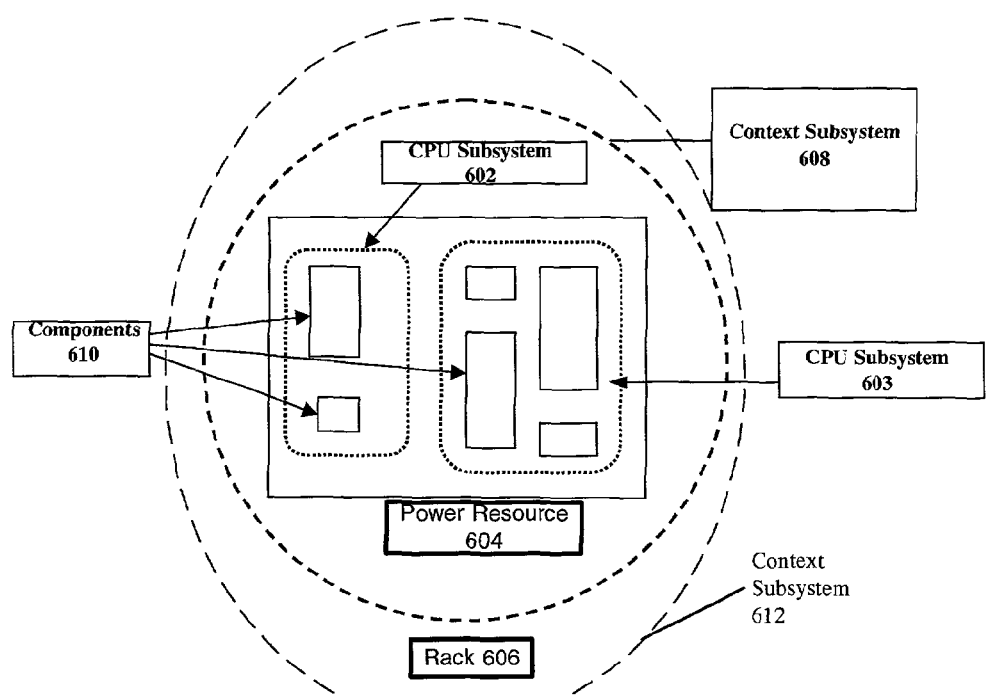
FIG. 6A illustrates a context subsystem for a system of partitioned hardware.

Partitioned hardware can be described as a single machine that is logically divided into multiple machines, such as computer systems (CPU subsystems) each with its own distinct components, such as a distinct operating system, memory, processors, cards, etc. Referring to FIG. 6A, a machine is partitioned into CPU subsystems 602 and 603 with each CPU subsystem consisting of components 610. CPU subsystems 602 and 603 include unique components 610 and also utilize common resources identified as power resource 604. Power resource 604 and CPU subsystems 602 and 603 all utilize common resource rack 606.

A typical implementation of a partitioned machine would indicate that ideally, an outer context subsystem should be created before inner context subsystems are added. The outer context subsystem 612 represents the partitioned machine as a whole and inner context subsystem 608 represents an inner context subsystem with power resource 604 and rack 606. CPU subsystems 602 and 603 represent further inner context subsystems, individual computers that are logically separated inside the shared hardware. A new inner context subsystem (or subsystem) is created when the user decides to divide configured hardware further or when automated configuration modeling logic decides to divide the configured hardware. In a highly modular implementation, configured hardware and its associated inner context subsystem may be added simultaneously. Note that if CPU subsystems 602 and 603 serve as leaf nodes in a context system data structure hierarchy, then CPU subsystems 602 may be context subsystems or ordinary subsystems.

Without context subsystem 608, there would be major complications in keeping parts of the machine configuration segregated and referenced properly in a configuration model representing the machine. For example, using conventional configuration technology, maintaining components in a partitioned system requires complex analysis of complicated code to determine what effect removal of a single component will cause because resources configured to live with the removed component may be necessary for other components in the system. With a context subsystem, it is a relatively simple task to identify each component that utilizes a common resource, and the common resource lives within the context subsystem rather than any individual component.

Figure 6B:
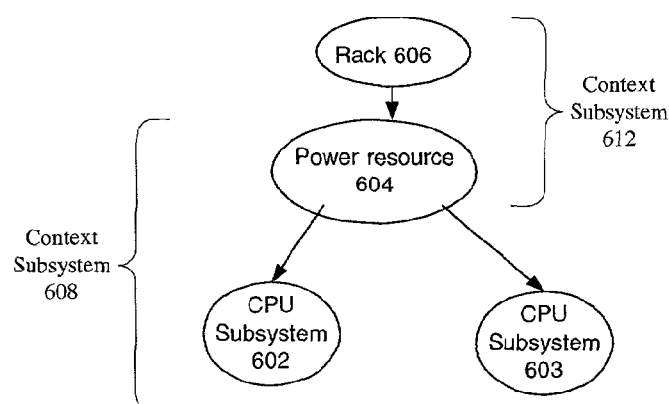
FIG. 6B illustrates a context subsystem data structure of the context subsystem illustrated in FIG. 6A.

FIG. 6B illustrates a context subsystem data structure of the context subsystem illustrated in FIG. 6A. Note that child subsystems may be created to utilize all resources of all higher level parent context subsystems. For example, CPU subsystems 602 and 603 can utilize power resource 604 and rack 606.

Referring to FIG. 7, networks may need specific components grouped by building, room, region, etc. These groupings may be implemented using context subsystems. The building, room, region, etc. is represented by the context subsystem and defined by automated model logic using, for example, the previously described functions, or by model logic when a user dictates that there is to be some kind of locating context. The user may ask the model to define rooms before components are added or may combine components into rooms after components are added to a configuration. In one embodiment, regardless of the timing, components that are in relative close proximity are not kept together as a unit until they are enveloped by a context subsystem.

Figure 7A:
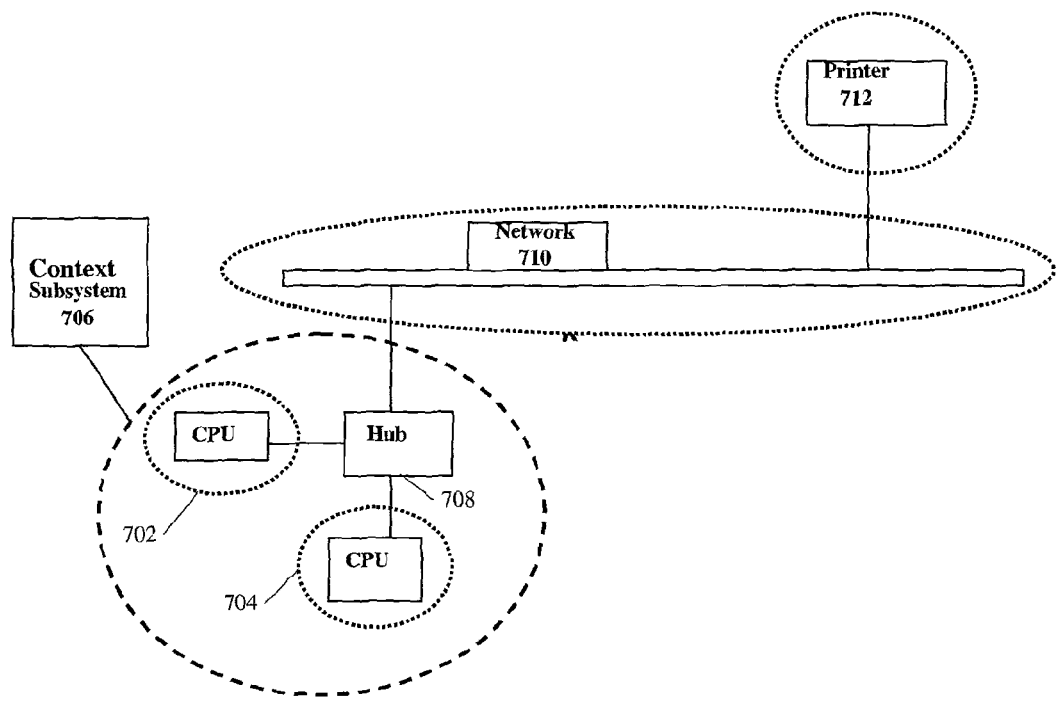
FIG. 7A illustrates a context subsystem for a data network system.

In FIG. 7A, the context subsystem 706 has parent attributes, hub 708, and multiple children, CPUs 702 and 704. Context subsystem 706 is also configured to connect to printer 712 through network 710. Many resources, not shown, may actually form intermediary connections between CPUs 702 and 704 and hub 708. However, to determine, for example, whether hub 708 is utilized by CPU 702, context subsystem 706 need only be reviewed rather than tracing through all intermediary connections.

As network configuration complexity increases, all kinds of existing and new hardware is and will be required to implement the networks. Multiple protocols, other software applications, operating systems, etc. are needed by hubs, clients, etc. Thus, conventional configuration code is extremely complex. If one hub were removed, conventional configuration code would be traced, modified, and tested to ensure that removing the hub did not also remove resources necessary for other components. Context subsystems facilitate an elegant solution to organizing, maintaining, and locating contextual configuration data.

Figure 7B:
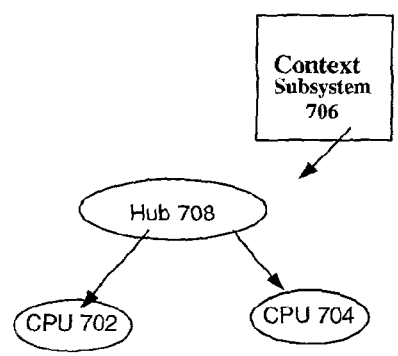
FIG. 7B illustrates a context subsystem data structure of the context subsystem illustrated in FIG. 7A.

FIG. 7B illustrates a context subsystem data structure of the context subsystem illustrated in FIG. 7A.

Referring to FIG. 8, NUMA (Non-Uniform Memory Access) is a type of parallel processing architecture in which each processor has its own local memory but can also access memory local to other processors. In terms of configuration implementations, it can be described as individual machines that can act as one machine. There is one copy of an operating system and single copies of any additional software for the entire complex of machines. Common instances/components reside in a context subsystem that envelopes the individual context subsystems of each machine.

Figure 8A:
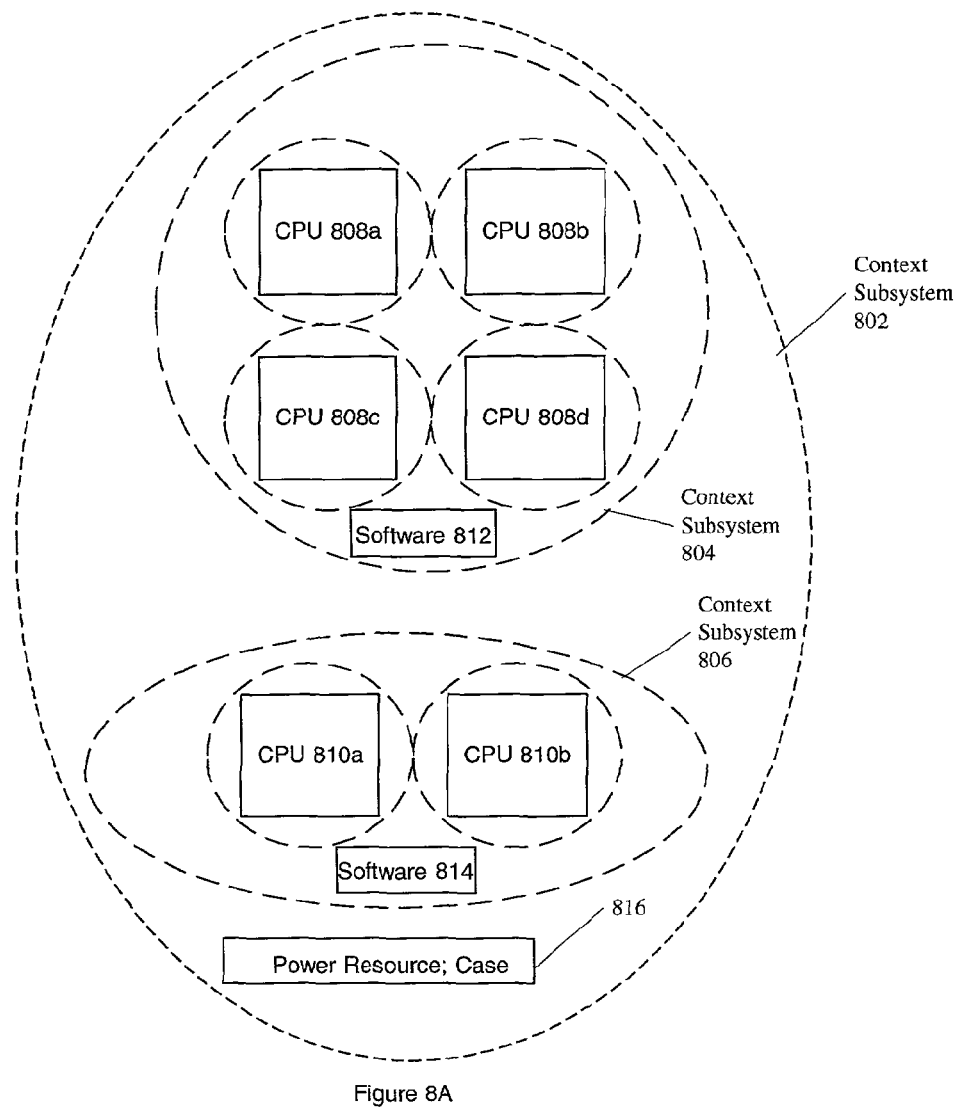
FIG. 8A illustrates context subsystems for a NUMA system.

In the NUMA embodiment of FIG. 8A, CPUs 808*a-d* have their own processors and local memory but utilize common resource software 812. Thus, a context subsystem is formed to include the software 812 as a parent and CPUs 808*a-d* as children. Thus, software 812 is not required to live with any particular CPU and the removal of a CPU from a configuration does not affect the remaining CPUs access to software 812. Tracing through and analyzing complex configuration code to determine the impact of removing a CPU is no longer required. Only the context subsystem need be traversed.

The NUMA embodiment of FIG. 8A also includes a second grouping of CPUs 810*a*-810*b* that utilize common resource software 814. Thus, a context subsystem is formed to include the software 814 as a parent and CPUs 810*a-b* as children. Furthermore, an outermost, top level context subsystem 802 encapsulates power resource and case 816, which are shared resources to context subsystems 804 and 806. Thus, it is apparent even in extremely complex configuration environments, context subsystems can greatly simplify the organization, location, and maintainability of configurations.

Software developers/configuration experts may decide to invoke a context subsystem before or after one or all of the individual machines are configured. This event may be triggered by a user driven action or by automated logic in the model. Preferably, a NUMA configuration is not created until all individual machines are grouped together and configured using a context subsystem.

Figure 8B:
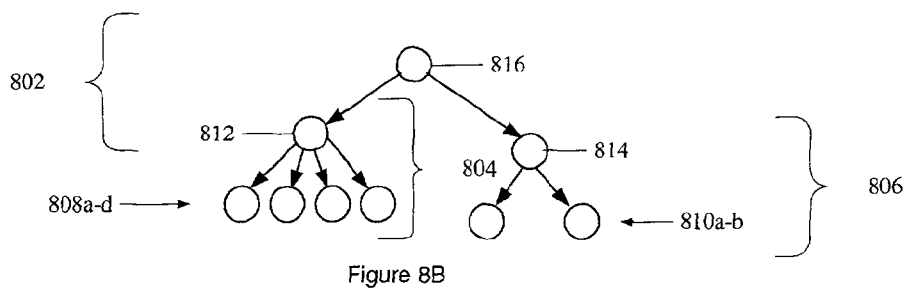
FIG. 8B illustrates context subsystem data structures of the context subsystems illustrated in FIG. 8A.

FIG. 8B illustrates context subsystem data structures of the context subsystems illustrated in FIG. 8A.

Figure 9A:
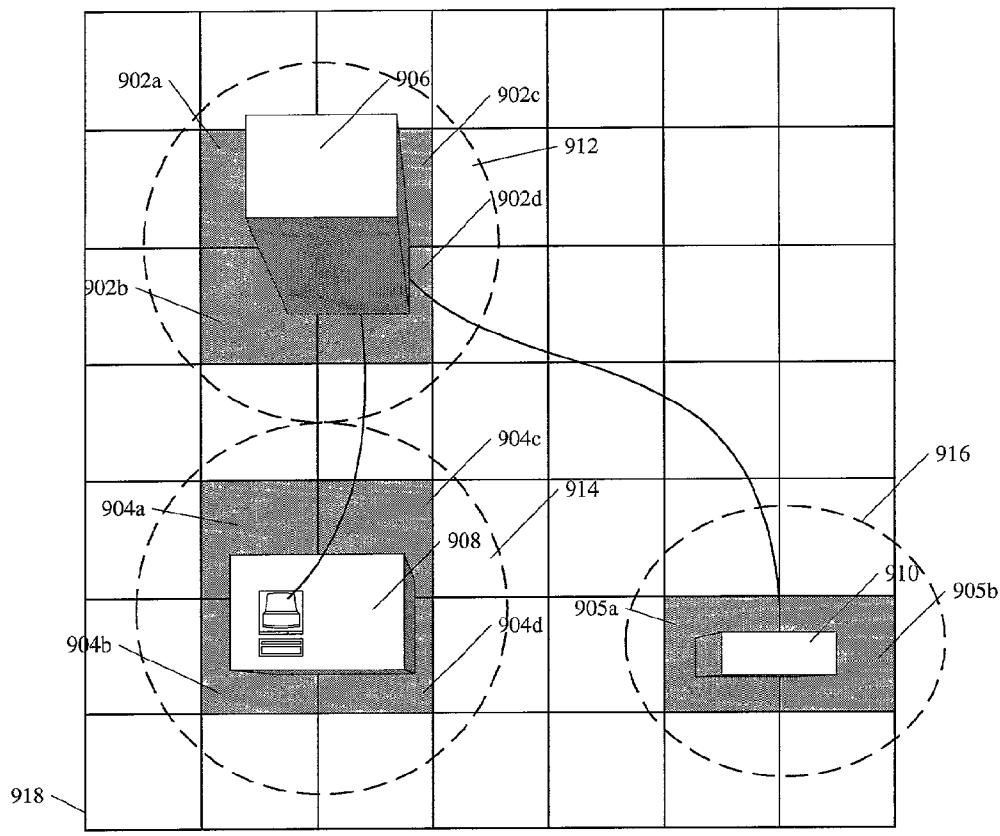
FIG. 9A illustrates context subsystems for a spatially oriented network from a spatial orientation perspective.

Referring to FIG. 9A, context subsystems can be used to solve configuration related problems involving spatial orientation and/or physical connections and resource utilization. Space 918 is broken down into 2-dimensional floor grids. Context subsystem 912 includes floor grids 902*a-d* as parents and resource 906 as a child. Context subsystem 914 includes floor grids 904*a-d* as parents and resource 908 as a child. Each floor grid may have attributes such as location, lighting, temperature, power resource, etc. Thus, by using context subsystems, spatial locations are easily configured and moving resources from one location to another necessitates only replacing parents in the context subsystem. Configuration models of connection devices, such as cables, may reference the context subsystem to obtain the location of the resource to which they connect.

The two dimensional grid of context subsystems that constitute a given granularity of a floor plan should normally be configured before any components are configured. Some or all of the components may reside in additional context subsystems and these preferably reside in the context subsystems of the grid.

It will be recognized that three-dimensional grids may be used for spatial location as well.

Figure 9B:
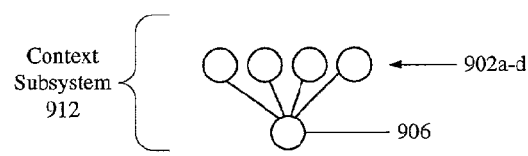
FIGS. 9B-9D illustrate context subsystem data structures for the context subsystems illustrated in FIG. 9A.
Figure 9C:
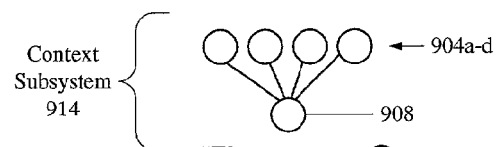
Figure 9D:
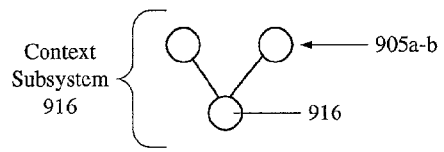

FIGS. 9B-9D illustrate context subsystem data structures for the context subsystems illustrated in FIG. 9A.

Referring to FIG. 10A, context subsystems can provide a convenient way to organize complicated external storage connections and complicated cross-rack implementations. Various context subsystems are formed around various resources that share one or more common resources. FIG. 10 also serves to demonstrate that resources can be children or parents of more than one context subsystem. Resources 1010 and 1014 are disposed in a first rack or container 1018. Resources 1012 and 1016 are disposed in a second rack or container 1020. For example, context subsystem 1002 is created to contextually group CPU 1010 and storage 1014 as they may share one or more common resources such as a cable, protocol software, etc. Context subsystem 1004 is created to contextually group CPU 1012 and storage 1014 as they may share one or more common resources. Context subsystem 1006 is created to contextually group CPU 1012 and storage 1014, and context subsystem 1008 is created to contextually group CPU 1010 and storage 1016. These complex racking schemes with resources configured across rack boundaries are prevalent in large computing systems. Furthermore, although resources may be physically separated, context subsystems can be used to create a virtual display representation of configured resources based on their contextual grouping which is distinct from their physical connections. For example, the virtual display could show computer 1010 and storage 1016 disposed as a single unit. Such display aids observers in comprehending the contextual links between resources.

Some systems may be comprised of context subsystems that share external storage arrays in a non-intuitive manner. Some context subsystems may be comprised of hardware elements that are spread between racks.

In this situation, the model should decide how and when to encapsulate various configured components using additional context subsystems. The context subsystems may be invoked as the model creates connections between components or when the model places cases into racks.

FIG. 10B illustrates a simplified representation of the context subsystems of FIG. 10A.

FIG. 10C illustrates context subsystem data structures for the context subsystems illustrated in FIGS. 10A and 10B.

Figure 11:
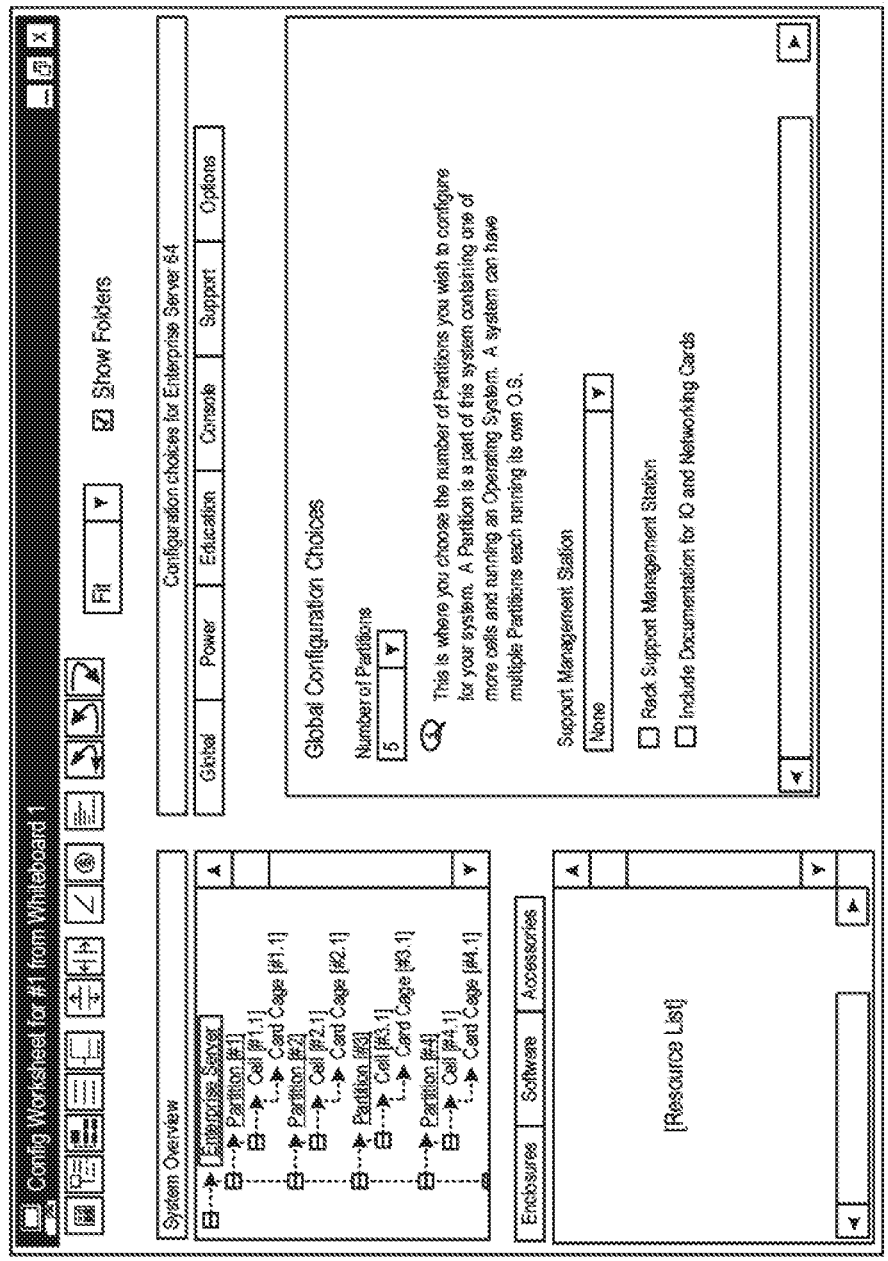
FIG. 11 illustrates a graphical user interface representation of a context subsystem for a partitioned computer system.

FIG. 11 illustrates a graphical user interface representation of a context subsystem for a partitioned computer system. A first window displays four trees, each with a level partition parent attribute of a context subsystem, a lower level Cell (which is a parent attribute to the Card Cage child attribute and a child attribute to the partition parent attribute), and a bottom or leaf level Card Cage child attribute. Each partition represents a parent level attribute of a context subsystem. The Enterprise Server could also represent the top-level parent attribute with the partition being a child attribute of the Enterprise Server. An additional partition, Partition [#5] may be accessed by scrolling down the first window. A second window can display a list of resources available for configuration of the Enterprise Server. Context subsystem parent and child attributes can be selected from the resource list.

Figure 12:
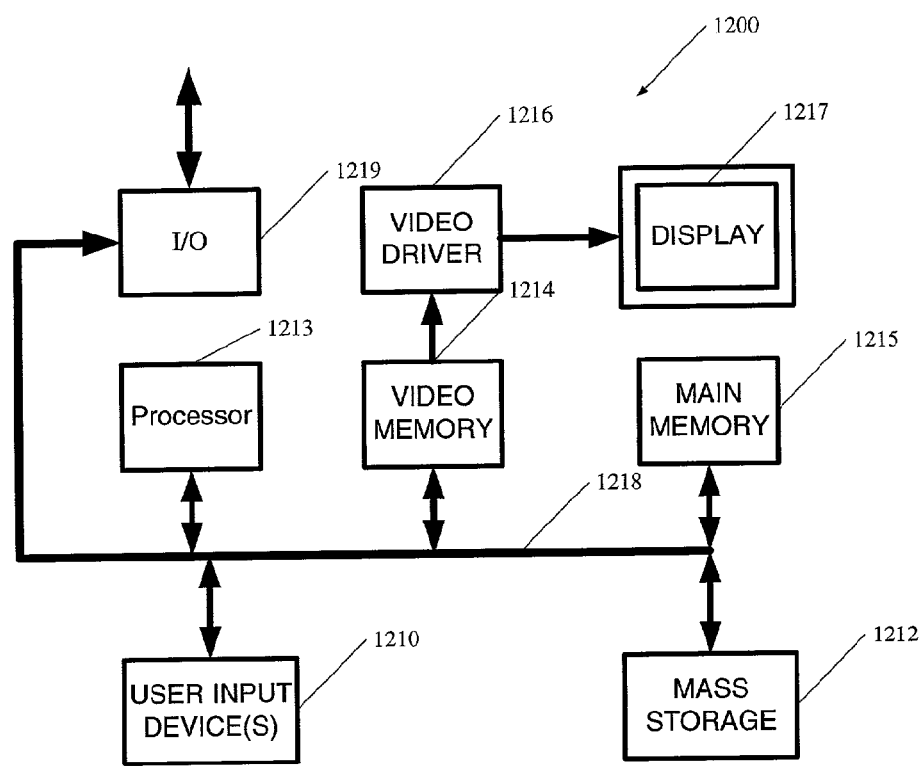
FIG. 12 illustrates a general computer system capable of implementing context subsystems.

The present invention can be implemented on a CPU such as a general-purpose computer 1200 illustrated in FIG. 12. Input user device(s) 1210, such as a keyboard and/or mouse, are coupled to a bi-directional system bus 1218. The input user device(s) 1210 are for introducing user input to the computer system and communicating that user input to processor 1213. The computer system of FIG. 12 also includes a video memory 1214, main memory 1215 and mass storage 1212, all coupled to bi-directional system bus 1218 along with input user device(s) 1210 and processor 1213. The mass storage 1212 may include both fixed and removable media, such as other available mass storage technology. Bus 1218 may contain, for example, 32 address lines for addressing video memory 1214 or main memory 1215. The system bus 1218 also includes, for example, a 32-bit DATA bus for transferring DATA between and among the components, such as CPU 1212, main memory 1215, video memory 1214 and mass storage 1212. Alternatively, multiplex DATA/address lines may be used instead of separate DATA and address lines.

Computer programs and data are generally stored as instructions and data in mass storage 1212 until loaded into main memory 1215 for execution. Computer programs may also be in the form of electronic signals modulated in accordance with the computer program and data communication technology when transferred via a network. The method and functions relating to context subsystems may be implemented in a computer program alone or in conjunction with other configuration technology such as the technology described in the Lynch Patent. Furthermore, context subsystem data structures can be implemented in CPU 1200 and utilized by CPU 1200 or by other data processing systems that have access to the data structures.

In the preferred embodiment of this invention, the processor 1213 is a 32-bit microprocessor manufactured by Motorola, such as the 680X0 processor or microprocessor manufactured by Intel, such as the 80X86, or Pentium processor. However, any other suitable microprocessor or microcomputer may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the display 1217. Video amplifier 1216 is well known in the art and may be implemented by any suitable means. This circuitry converts pixel DATA stored in video memory 1214 to a raster signal suitable for use by display 1217. Display 1217 is a type of monitor suitable for displaying graphic images.

The computer system described above is for purposes of example only. The present invention may be implemented in any type of computer system or programming or processing environment. It is contemplated that the present invention might be run on a stand-alone computer system, such as the one described above. The present invention might also be run from a server system that can be accessed by a plurality of client computer systems interconnected over an intranet network. Finally, the present invention may be run from a server that is accessible to clients over the Internet.

While the invention has been described with respect to the embodiments and variations set forth above, these embodiments and variations are examples and the invention is not to be considered limited in scope to these embodiments and variations. Accordingly, various other embodiments and modifications and improvements not described herein may be within the spirit and scope of the present invention, as defined by the following claims and their equivalents.

What is claimed is:

1. A method of generating a display of a representation of a configured system, wherein the representation of the system includes a plurality of resources configured to form the system and at least one group of the resources has a hierarchical contextual relationship that is logically distinct from a physical configuration relationship, the method comprising:

performing by a computer system programmed with code stored in a memory and executing by a processor of the computer system to configure the computer system into a machine for:

(a) retrieving the resources from a data storage device, wherein the resources include at least a first resource having a first contextual relationship with at least a second resource, wherein the first contextual relationship comprises a hierarchical contextual relationship that is logically distinct from a physical configuration relationship and is also independent of configuration modeling structural constraints;

generating first context information representing the contextual relationship about the first and second resources, wherein the first context information includes information representing a grouping of the first and second resources;

generating data from the resources to provide a visual display of the configured system, wherein the display includes the retrieved resources and the grouping of the first and second resources; and providing the data to a display device to present the visual display.

2. The method of claim 1 further comprising:
configuring the retrieved resources into data representing the configured system; and
after configuring the retrieved resources into the configured system, generating the data to provide the visual display of the configured system.

3. The method of claim 2 wherein configuring the retrieved resources into the configured system comprises:
processing a configuration modeling language that includes the resources and the context information to generate the data representing the configured system.

4. The method of claim 1 wherein each resource is selected from a group consisting of: a subsystem of resources, a component, or a context subsystem of resources.

5. The method of claim 1 wherein retrieving the resources further comprises:

(b) retrieving at least a third resource from the data storage device having a second contextual relationship with at least a fourth resource, wherein (i) the second contextual relationship is represented by second context information about the third and fourth resources, (ii) the first context information includes information representing a grouping of the first group of resources, (iii) the first contextual relationship comprises a hierarchical contextual relationship that is logically distinct from a physical configuration relationship and is also independent of configuration modeling structural constraints, and (iv) wherein the resources identified in (a) contain at least one resource not identified in (b).

6. The method of claim 5 wherein at least one of the first and second resources is utilized by at least one of the third and fourth resources by the configured system.

7. A system for generating a display of a representation of a configured system, wherein the representation of the system includes a plurality of resources configured to form the system and at least one group of the resources has a hierarchical contextual relationship that is logically distinct from a physical configuration relationship, the method comprising:

a processor of a computer system; and
a memory having code stored therein and executable by the processor of the computer system to configure the computer system into a machine for:

(a) retrieving the resources from a data storage device, wherein the resources include at least a first resource having a first contextual relationship with at least a second resource, wherein the first contextual relationship comprises a hierarchical contextual relationship that is logically distinct from a physical configuration relationship and is also independent of configuration modeling structural constraints;

generating first context information representing the contextual relationship about the first and second resources, wherein the first context information includes information representing a grouping of the first and second resources;

generating data from the resources to provide a visual display of the configured system, wherein the display includes the retrieved resources and the grouping of the first and second resources; and providing the data to a display device to present the visual display.

8. The system of claim 7 wherein the code is further executable by the processor of the computer system to further configure the computer system for:
configuring the retrieved resources into data representing the configured system; and
after configuring the retrieved resources into the configured system, generating the data to provide the visual display of the configured system.

9. The method of claim 8 wherein configuring the retrieved resources into the configured system comprises:
processing a configuration modeling language that includes the resources and the context information to generate the data representing the configured system.

10. The system of claim 7 wherein each resource is selected from a group consisting of: a subsystem of resources, a component, or a context subsystem of resources.

11. The system of claim 7 wherein retrieving the resources further comprises:

(b) retrieving at least a third resource from the data storage device having a second contextual relationship with at least a fourth resource, wherein (i) the second contextual relationship is represented by second context information about the third and fourth resources, (ii) the first context information includes information representing a grouping of the first and second of resources, (iii) the first contextual relationship comprises a hierarchical contextual relationship that is logically distinct from a physical configuration relationship and is also independent of configuration modeling structural constraints, and (iv) wherein the resources identified in (a) contain at least one resource not identified in (b).

12. The system of claim 7 wherein at least one of the first and second resources is utilized by at least one of the third and fourth resources by the configured system.

13. A nontransitory, computer readable storage medium having code stored therein for generating a display of a representation of a configured system, wherein the representation of the system includes a plurality of resources configured to form the system and at least one group of the resources has a hierarchical contextual relationship that is logically distinct from a physical configuration relationship, wherein the code is executable by a processor of a computer system to configure the computer system into a machine for:

(a) retrieving the resources from a data storage device, wherein the resources include at least a first resource having a first contextual relationship with at least a second resource, wherein the first contextual relationship comprises a hierarchical contextual relationship that is logically distinct from a physical configuration relationship and is also independent of configuration modeling structural constraints;

generating first context information representing the contextual relationship about the first and second resources, wherein the first context information includes information representing a grouping of the first and second resources;

generating data from the resources to provide a visual display of the configured system, wherein the display includes the retrieved resources and the grouping of the first and second resources; and providing the data to a display device to present the visual display.

14. The computer readable storage medium of claim 13 wherein the code is further executable by the processor of the computer system to further configure the computer system for:

configuring the retrieved resources into data representing the configured system; and after configuring the retrieved resources into the configured system, generating the data to provide the visual display of the configured system.

15. The computer readable storage medium of claim 14 wherein configuring the retrieved resources into the configured system comprises:

processing a configuration modeling language that includes the resources and the context information to generate the data representing the configured system.

16. The computer readable storage medium of claim 13 wherein each resource is selected from a group consisting of: a subsystem of resources, a component, or a context subsystem of resources.

17. The computer readable storage medium of claim 13 wherein retrieving the resources further comprises:

(b) retrieving at least a third resource from the data storage device having a second contextual relationship with at least a fourth resource, wherein (i) the second contextual relationship is represented by second context information about the third and fourth resources, (ii) the first context information includes information representing a grouping of the first and second resources, (iii) the first contextual relationship comprises a hierarchical contextual relationship that is logically distinct from a physical configuration relationship and is also independent of configuration modeling structural constraints, and (iv) wherein the resources identified in (a) contain at least one resource not identified in (b).

18. The computer readable storage medium of claim 13 wherein at least one of the first and second resources is utilized by at least one of the third and fourth resources by the configured system.

* * * * *